United States Patent
Ren et al.

(10) Patent No.: US 12,322,159 B2
(45) Date of Patent: Jun. 3, 2025

(54) MEDICAL IMAGE ACQUISITION APPARATUS AND METHOD

(71) Applicant: GE Precision Healthcare LLC, Wauwatosa, WI (US)

(72) Inventors: Jialiang Ren, Beijing (CN); Jingjing Xia, Shanghai (CN); Zhoushe Zhao, Beijing (CN)

(73) Assignee: GE Precision Healthcare LLC, Waukesha, WI (US)

( * ) Notice: Subject to any disclaimer, the term of this patent is extended or adjusted under 35 U.S.C. 154(b) by 303 days.

(21) Appl. No.: 17/719,606

(22) Filed: Apr. 13, 2022

(65) Prior Publication Data

US 2022/0351499 A1 Nov. 3, 2022

(30) Foreign Application Priority Data

Apr. 29, 2021 (CN) .......................... 202110472868.1

(51) Int. Cl.
*G06V 10/774* (2022.01)
*G06T 7/00* (2017.01)
*G06V 10/82* (2022.01)

(52) U.S. Cl.
CPC .......... *G06V 10/774* (2022.01); *G06T 7/0012* (2013.01); *G06V 10/82* (2022.01); *G06T 2207/10088* (2013.01)

(58) Field of Classification Search
CPC .... G06V 10/774; G06V 10/82; G06T 7/0012; G06T 2207/10088
See application file for complete search history.

(56) References Cited

U.S. PATENT DOCUMENTS

| 7,170,290 B2 | 1/2007 | Miyoshi | |
| 2010/0232667 A1* | 9/2010 | Azar | A61B 5/418 |
| | | | 600/420 |
| 2017/0069085 A1* | 3/2017 | Sakamoto | G06T 7/0012 |

(Continued)

FOREIGN PATENT DOCUMENTS

| JP | 5942268 B2 * | 6/2016 | .......... A61B 5/7207 |
| KR | 20020014746 A * | 2/2002 | .......... G06T 5/20 |

OTHER PUBLICATIONS

Yang et al. ("Autoencoder with invertible functions for dimension reduction and image reconstruction." IEEE Transactions on Systems, Man, and Cybernetics: Systems 48.7 (2016): 1065-1079). (Year: 2016).*

(Continued)

*Primary Examiner* — Pinalben Patel
(74) *Attorney, Agent, or Firm* — Andrus Intellectual Property Law, LLP

(57) ABSTRACT

Embodiments of the present application provide a medical image acquisition apparatus and method. The apparatus comprises: a preprocessing unit, for preprocessing an original image signal to obtain a first number of input images; and a determination unit, for using a training model to determine an analytic relationship between respective pixels at the same position in the first number of input images, and determining, according to the analytic relationship, a second number of medical functional parameter diagrams corresponding to the original image signal. The embodiments achieve fast calculation of SyMRI function parameter diagrams and high scalability.

20 Claims, 6 Drawing Sheets

(56) References Cited

U.S. PATENT DOCUMENTS

2020/0142017 A1* 5/2020 Taniguchi .......... G01R 33/5608
2023/0280431 A1* 9/2023 Frahm ................ G01R 33/5608
324/309

OTHER PUBLICATIONS

Cheng et al. "Deep convolutional autoencoder-based lossy image compression." 2018 Picture Coding Symposium (PCS). IEEE, 2018, https://arxiv.org/pdf/1804.09535.pdf, 6 pages.

Warntjes, "Synthesized Magnetic Resonance Imaging and SyMRI Theory and Application A White Paper" 2017, 11 pages.

Yang et al., "Autoencoder with invertible functions for dimension reduction and image reconstruction." IEEE Transactions on Systems, Man, and Cybernetics: Systems 48.7 (2016): 1065-1079, 15 pages.

Zeng et al. "Coupled deep autoencoder for single image super-resolution." IEEE transactions on cybernetics 47.1 (2015): 27-37, 12 pages.

* cited by examiner

MEDICAL IMAGE ACQUISITION APPARATUS AND METHOD

CROSS REFERENCE

The present application claims priority and benefit of Chinese Patent Application No. 202110472868.1 filed on Apr. 29, 2021, which is incorporated herein by reference in its entirety.

FIELD OF THE INVENTION

Embodiments of the present application relate to the technical field of medical devices, and in particular to a medical image acquisition apparatus and method.

BACKGROUND OF THE INVENTION

Currently, medical imaging devices are increasingly widely used to scan a subject under test (such as the human body) to obtain a medical image of a specified part (such as the whole or a part of each organ in the body, or a specific region of interest) so as to provide useful information for medical diagnosis. Medical image scanning includes computed tomography (CT), magnetic resonance (MR), digital subtraction angiography (DSA), etc.

MR-based examination is one of the most common diagnostic methods in medical examination, and features non-radiation and has good soft tissue imaging effects. However, the MR-based examination usually takes a long time, which is 30 minutes per patient on average. Currently, MR is mainly used for weighted imaging. However, the acquired images cannot be used for quantitative analysis of components; as a result, the MR images cannot achieve quantitative and accurate diagnosis.

In order to reduce scanning time, a technique referred to as synthesized MM (SyMRI) has been developed. The synthesized MM technique can determine quantitative parameters according to signals acquired in a single scan and then use a magnetic resonance signal formula to generate multiple medical functional parameter diagrams (also referred to as contrast images). Therefore, the scanning time in a routine examination can be reduced to less than ten minutes. However, after scanning, it is necessary to use a complex analytical formula to perform calculation to obtain the aforementioned multiple medical functional parameter diagrams.

BRIEF DESCRIPTION OF THE INVENTION

Conventionally, SyMRI is accomplished using a complex mathematical formula by means of analytic calculation. Therefore, a method for performing iterative analysis and solution with respect to multiple medical functional parameter diagrams using SyMRI techniques takes a long time and requires support from hardware processing devices having strong capabilities. As a result, the advantage of fast scanning at an early SyMRI stage is not highlighted.

Deep learning is currently a hotspot technical field, and can solve many complex computing problems. Convolutional neural networks (CNNs) are currently the most commonly used method in deep learning. However, key application of this method is to extract regional features in an image for image recognition or classification. A SyMRI medical functional parameter diagram is obtained by calculating each pixel using a specific analytical formula and further summarizing relationships between adjacent pixels. Therefore, a conventional convolutional neural network model cannot be directly used to calculate a medical functional parameter diagram.

In addition, the current commonly used CNN models all feature regional convolution sliders, and acquire relationships between adjacent pixels in an image to extract regional features. This is quite different from the principle of calculating medical functional parameter diagrams in SyMRI.

In view of at least one of the aforementioned technical problems, embodiments of the present application provide a medical image acquisition apparatus and method, which can achieve fast calculation of SyMRI function parameter diagrams and high scalability.

According to an aspect of the embodiments of the present application, a medical image acquisition apparatus is provided, wherein the apparatus comprises: a preprocessing unit, for preprocessing an original image signal to obtain a first number of input images; and a determination unit, for using a training model to determine an analytic relationship between respective pixels at the same position in the first number of input images, and determining, according to the analytic relationship, a second number of medical functional parameter diagrams corresponding to the original image signal.

In some embodiments, the preprocessing unit acquires echo signals corresponding to different excitation pulses, the number of the echo signals being the first number, and determines the first number of input images according to the first number of echo signals.

In some embodiments, the preprocessing unit extracts the square root of the sum of the square of a real part and the square of an imaginary part corresponding to each echo signal, so as to obtain a corresponding input image.

In some embodiments, the first number is equal to eight.

In some embodiments, the training model is a convolutional neural network having an encoder-decoder structure, each of an encoder module and a decoder module of the convolutional neural network comprises at least one convolutional layer, and each convolutional layer uses a 1×1 convolution kernel.

In some embodiments, the number of channels of a first convolutional layer of the encoder module is equal to the first number.

In some embodiments, the convolutional neural network uses a leaky rectification unit activation function.

In some embodiments, the medical functional parameter diagrams comprise a quantitative parameter diagram and a weighted parameter diagram.

According to an aspect of the embodiments of the present application, a medical image acquisition method is provided, wherein the method comprises preprocessing an original image signal to obtain a first number of input images; and using a training model to determine an analytic relationship between respective pixels at the same position in the first number of input images, and determining, according to the analytic relationship, a second number of medical functional parameter diagrams corresponding to the original image signal.

According to an aspect of the embodiments of the present application, a magnetic resonance imaging system is provided, wherein the system comprises a gradient coil assembly configured to generate a gradient magnetic field. The system further comprises a radio-frequency coil assembly, configured to transmit a radio-frequency excitation pulse; and a controller, communicating with the gradient coil assembly and the radio-frequency coil assembly. The controller is configured to instruct the gradient coil assembly to generate a magnetic field gradient for use during MM scanning; instruct the radio-frequency coil assembly to generate and transmit a radio-frequency excitation pulse sequence and to receive a resultant MR signal from a scanned object; determine an original image signal according to the MR signal, and preprocess the original image signal to obtain a first number of input images. The controller is further configured to use a training model to determine an analytic relationship between respective pixels at the same position in the first number of input images, and determine, according to the analytic relationship, a second number of medical functional parameter diagrams corresponding to the original image signal.

According to another aspect of the embodiments of the present application, a medical image acquisition device is provided, and comprises a memory and a processor, the memory having a computer program stored therein, and the processor being configured to execute the computer program so as to implement the foregoing medical image acquisition method.

According to another aspect of the embodiments of the present application, a storage medium having a computer-readable program stored therein is provided, wherein the computer-readable program enables a computer to implement, in a medical image acquisition device, the foregoing medical image acquisition method.

One of the beneficial effects of the embodiments of the present application is as follows: a training model is used to determine an analytic relationship between respective pixels at the same position in multiple input images, and multiple medical functional parameter diagrams are determined according to the analytic relationship, thereby achieving fast calculation of SyMRI function parameter diagrams and high scalability.

With reference to the following description and accompanying drawings, particular implementations of the embodiments of the present application are disclosed in detail, indicating manners in which the principles of the embodiments of the present application may be used. It should be understood that the scope of the implementations of the present application is not limited thereto. The implementations of the present application comprise many alternations, modifications, and equivalents within the scope of the spirits and items of the appended claims.

BRIEF DESCRIPTION OF THE DRAWINGS

The accompanying drawings incorporated are used to provide further understanding of embodiments of the present application, and constitute a part of the description. The accompanying drawings are used to illustrate implementations of the present application, and serve to explain the principles of the present application together with the description. Apparently, the accompanying drawings in the following description merely illustrate some embodiments of the present application, and a person of ordinary skill in the art may further derive other implementations according to these accompanying drawings without creative efforts. In the accompanying drawings.

DETAILED DESCRIPTION

Figure 1:
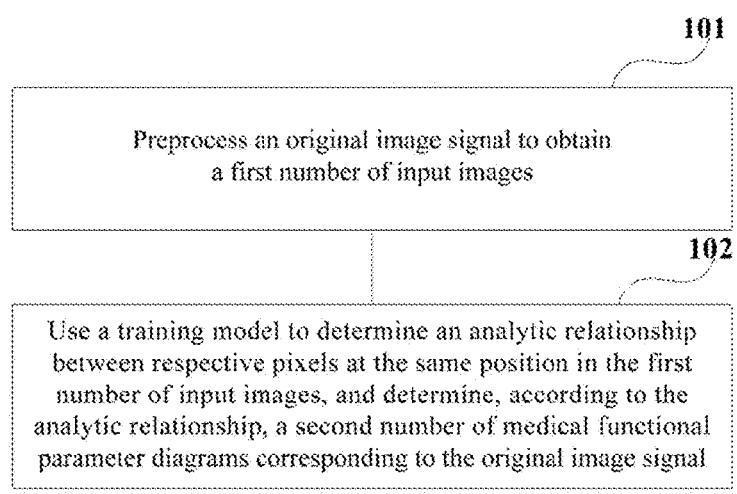
FIG. 1 is a schematic diagram of a medical image acquisition method according to an embodiment of the present application.

The aforementioned and other features of embodiments of the present application will become apparent from the following description and with reference to the accompanying drawings. In the description and the accompanying drawings, particular implementations of the present application are specifically disclosed, which indicate some implementations in which the principles of the embodiments of the present application may be employed. It should be understood that the present application is not limited to the described implementations. On the contrary, the embodiments of the present application include all modifications, variations, and equivalents falling within the scope of the appended claims.

In the embodiments of the present application, the terms "first," "second," etc. are used to differentiate different elements with respect to names, but do not indicate spatial arrangement or temporal orders of these elements, and these elements should not be limited by these terms. The term "and/or" includes any one and all combinations of one or more relevantly listed terms. The terms "contain," "include," "have," etc. refer to presence of stated features, elements, components, or assemblies, but do not exclude presence or addition of one or more other features, elements, components, or assemblies.

In the embodiments of the present application, singular forms "a," "the," etc. include plural forms, and should be construed as "a kind of" or "a type of" in a broad sense, rather than defined as meaning "one." In addition, the term "the" should be construed as including both a singular form and a plural form, unless specified otherwise in the context. In addition, the term "according to" should be construed as "at least partially according to," and the term "based on" should be understood as "at least partially based on," unless specified otherwise in the context.

Features described and/or illustrated with respect to one implementation may be used in the same or similar way in one or more other implementations and in combination with or in replacement of features in the other implementations. When used herein, the term "include/contain" refers to presence of features, integers, steps, or assemblies, but does not exclude presence or addition of one or more other features, integers, steps, or assemblies.

The device for acquiring medical image data described herein is applicable to various medical imaging modalities, including, but not limited to, a computed tomography (CT) device, a magnetic resonance imaging (MM) device, a C-arm imaging device, a positron emission computed tomography (PET) device, a single photon emission computed tomography (SPECT) device, or any other suitable medical imaging device.

A system for acquiring medical images may include the aforementioned medical imaging device, and may also include a separate computer device connected to the medical imaging device, and may further include a computer device connected to an Internet cloud. The computer device is connected, via the Internet, to the medical imaging device or a memory storing medical images. An imaging method can be implemented independently or jointly by the aforementioned medical imaging device, the computer device connected to the medical imaging device, and the computer device connected to the Internet cloud.

Exemplarily, the embodiments of the present application are described below in conjunction with a magnetic resonance imaging device. Those skilled in the art could understand that the embodiments of the present application can also be applied to other medical imaging devices.

Exemplarily, in magnetic resonance imaging, various images will be generated, which are referred to below as medical functional parameter diagrams, and may also be referred to as contrast images. The medical functional parameter diagrams include a quantitative parameter diagram and a weighted parameter diagram, such as a T1 (longitudinal relaxation time) image, a T2 (transverse relaxation time) image, a proton density (PD) image, a T1 weighted image (T1WI), a T2 weighted image (T2WI), a fluid attenuated inversion recovery (FLAIR) image, a short inversion time inversion recovery (short T1 inversion recovery, STIR) image, etc. Each type of image can provide tissue information having different contrast so as to assist a doctor in diagnosis. For example, the proton density weighted image emphasizes differences in spin densities of various tissues/fluids under analysis; the T1 weighted image emphasizes differences in relaxation time for longitudinally recovering magnetization; the T2 weighted image emphasizes differences in relaxation time for transversely recovering magnetization; the FLAIR suppresses signals from a fluid, etc. Examples are not enumerated herein, and reference may be specifically made to the prior art.

In addition, a medical imaging workstation may be disposed locally at the medical imaging device. That is, the medical imaging workstation is disposed adjacent to the medical imaging device, and the two may be co-located in a scanning room, an imaging department, or the same hospital. A medical image cloud platform analysis system may be located away from the medical imaging device, for example, disposed at a cloud communicating with the medical imaging device.

As an example, after a medical institution completes an imaging scan using the medical imaging device, data obtained during the scan is stored in a storage device. The medical imaging workstation may directly read the data obtained during the scan, and perform image processing by using a processor thereof. As another example, the medical image cloud platform analysis system may read the medical image in the storage device by remote communication to provide "software as a service (SAAS)". The SAAS may exist between hospitals, between a hospital and an imaging center, or between a hospital and a third-party online diagnosis and treatment service platform.

The embodiments of the present application will be specifically described below.

Embodiments of the First Aspect

An embodiment of the present application provides a medical image acquisition method. FIG. 1 is a schematic diagram of the medical image acquisition method according to the embodiment of the present application. As shown in FIG. 1, the method includes: at step 101, preprocessing an original image signal to obtain a first number of input images; and at step 102, using a training model to determine an analytic relationship between respective pixels at the same position in the first number of input images, and determining, according to the analytic relationship, a second number of medical functional parameter diagrams corresponding to the original image signal.

It is worth noting that FIG. 1 merely schematically illustrates the embodiment of the present application, but the present application is not limited thereto. For example, the execution order of the operations may be adjusted appropriately. In addition, some other operations may be added, or some of the operations may be skipped. Those skilled in the art could make appropriate variations according to the above disclosure, instead of being limited merely to the disclosure of FIG. 1.

In some embodiments, the original image signal is obtained by scanning a region of interest of a scanned object by a magnetic resonance instrument. For example, during the scanning, an excitation pulse signal (scanning sequence) may be emitted via a transmitting coil, and a resultant magnetic resonance signal from the scanned object may be sensed and received by a receiving coil, so as to obtain the original image signal. Optionally, the scanning sequence may be a QRAPMASTER (quantification of relaxation times and proton density by multi-echo acquisition of a saturation-recovery using turbo spin-echo readout) sequence. However, the present application is not limited thereto, and other types of sequences may also be used. For details, reference may be made to the prior art, and the details are not repeated herein.

In some embodiments, signal intensities of multiple echoes and multiple delay times may be directly acquired in one sequence to acquire a first number of echo signals corresponding to different excitation pulses, and the first number of input images may be determined according to the first number of echo signals. For example, when the scanning sequence is a QRAPMASTER sequence, a saturation-recovery multi-stage multi-echo multi-saturation delayed signal may be acquired from a turbo spin echo, and the first number of input images may be acquired by means of different combinations of echo times (TE) and saturation delay times. That is, the first number may be determined by a configured number of TEs and a configured number of saturation delay times. The first number may be equal to the product of the configured number of TEs and the configured number of saturation delay times. For example, two TEs and four saturation delay times are used to generate eight complex images within one section to serve as the first number of input images. The TE value may be configured to be 16.9 ms and 84.5 ms, but this embodiment of the present application is not limited thereto. The complex image includes a real part (hereinafter referred to as a real image) and an imaginary part (hereinafter referred to as an imaginary image). That is, two TEs and four saturation delay times are used to generate eight real images and eight imaginary images in one section. The above is merely an example for description, but this embodiment of the present application is not limited thereto. The number of delay times and the number of echoes may also be other values, and examples are not enumerated herein. In addition, Fourier transform may be performed on the echo signal to obtain corresponding image data. For details, reference may be made to the prior art, and the details are not repeated herein.

Figure 2:
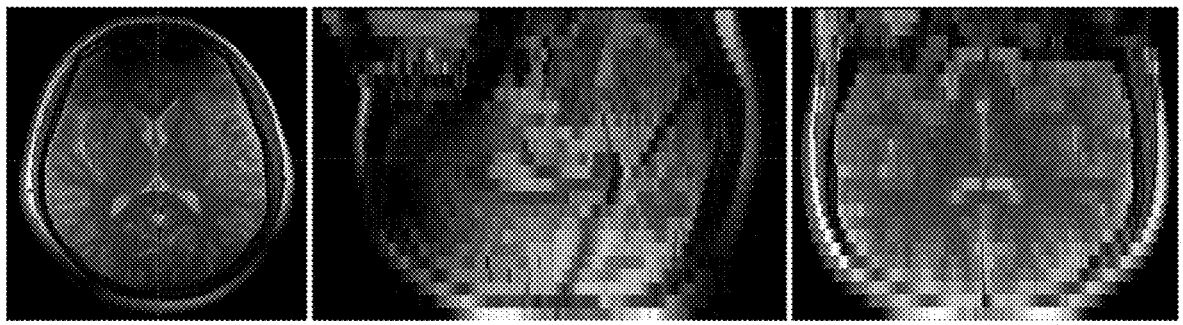
FIG. 2 is a schematic diagram of a modular image according to an embodiment of the present application.
Figure 3:
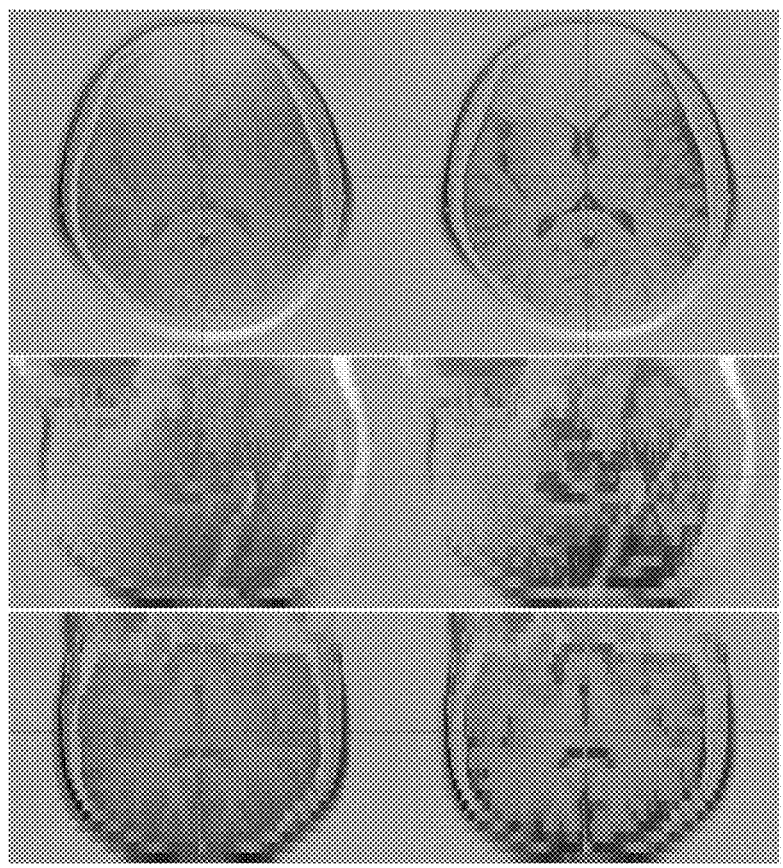
FIG. 3 is a schematic diagram of a real part and an imaginary part in a SyMRI image according to an embodiment of the present application.

In some embodiments, in order to reduce computational complexity, the square root of the sum of the square of a real part and the square of an imaginary part corresponding to each echo signal may be extracted to obtain a corresponding input image (also referred to as a modular image). That is, during signal acquisition, only a modulo part of a received signal is determined (only the magnitude of the signal is considered, and the direction or the phase of the signal is not considered), and a reconstructed image is also a modular image. FIG. 2 is a schematic diagram of the modular image obtained by calculation. Alternatively, it may also be regarded that each of the aforementioned complex images is divided into a real part and an imaginary part. FIG. 3 is a schematic diagram of a real part and an imaginary part of an image in SyMRI (the left is the real part, and the right is the imaginary part). The square root of the sum of the square of a real part and the square of an imaginary part of a corresponding pixel location is extracted. For example, the following formula (1) is used to convert an original echo signal (complex image) into a modular image:

$$\text{modular} = \sqrt{\text{real}^2 + \text{imaginary}^2} \quad \text{formula (1)}$$

In the formula, modular represents the modular image, real represents the real part, and imaginary represents the imaginary part. Formula (1) is used to process each echo signal (complex image) so as to obtain a first number of modular images to serve as the first number of input images and input the same into the training model.

In some embodiments, the training model is a convolutional neural network having an encoder-decoder structure. The number of channels of the first convolutional layer of an input layer, namely an encoder module, of the training model is the first number. In other words, an input to the training model can be regarded as an image having the first number of channels, and each channel of the image corresponds to one input image.

In some embodiments, the number of channels of the last convolutional layer of an output layer, namely a decoder module, of the training model is a second number. The second number is determined and adjusted according to the number of medical functional parameter diagrams to be acquired. The second number may be one, or three, or six, etc., and this embodiment of the present application is not limited thereto. For example, when the second number is six, the second number of medical functional parameter diagrams may be T1, T2, PD, T1WI, T2WI, and T2WI FLAIR. Examples are not enumerated herein.

In some embodiments, each convolutional layer of the convolutional neural network uses a 1×1 convolution kernel so as to determine an analytic relationship between respective pixels at the same position in the first number of input images. Since the convolution kernel has a size of merely 1×1, it is not necessary to consider a relationship between each pixel and surrounding adjacent pixels. Instead, it is only necessary to linearly combine pixel information at the same position in different channels, equivalent to performing convolution on different channels. The same processing is performed on each pixel to determine the analytic relationship between the respective pixels at the same position in the first number of input images. In other words, by configuring the convolution kernel of each convolutional layer of the convolutional neural network to be 1×1, namely, by using the training model to automatically search for a solution formula of each medical functional parameter diagram in SyMRI by means of single-pixel step-by-step calculation, the second number of medical functional parameter diagrams are outputted. In addition, by using the 1×1 convolution kernel, non-linear characteristics may also be added without changing the scale (i.e., without loss of resolution).

In some embodiments, in order to ensure that the training model can learn and understand a complex non-linear relationship, the convolutional neural network may also use a rectified linear unit (ReLU) as an activation function. In order to retain learned positive and negative information, the rectification linear unit activation function may be a leaky rectification unit activation function (Leaky Relu). For example, the rectification linear unit activation function may be used after an convolution operation is performed on each convolutional layer, but this embodiment of the present application is not limited thereto.

Figure 4:
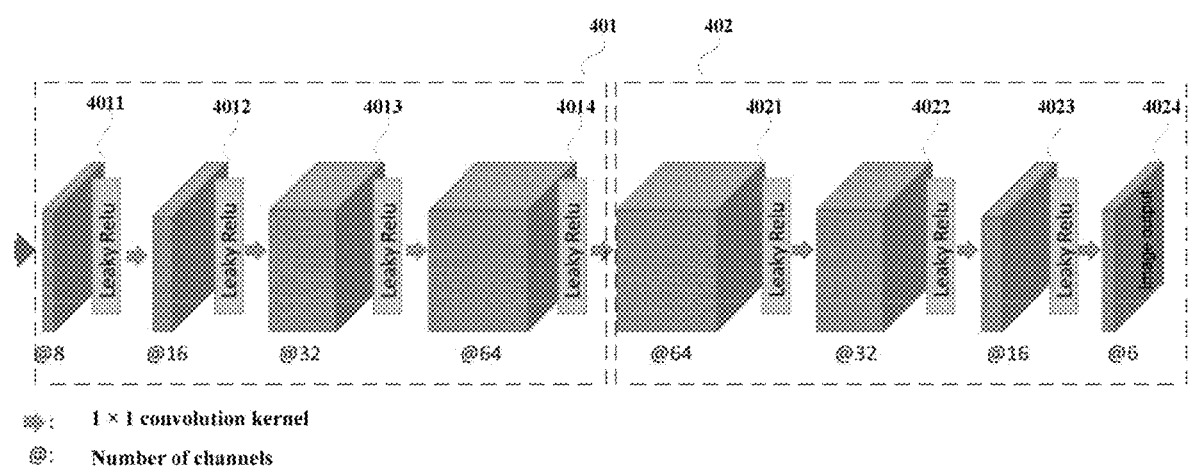
FIG. 4 is an example diagram of the structure of a training model according to an embodiment of the present application.

In some embodiments, each of the encoder module and the decoder module of the convolutional neural network includes at least one convolutional layer. The first convolutional layer of the encoder module is the input layer of the training model. The last convolutional layer of the decoder module is the output layer of the training model. The encoder module and the decoder module have the same number of convolutional layers. The last convolutional layer of the encoder module and the first convolutional layer of the decoder module use the same number of channels. For example, the encoder module and the decoder module each consist of four convolutional layers. FIG. 4 is a schematic diagram of the structure of the training model. As shown in FIG. 4, the encoder module 401 includes convolutional layers 4011, 4012, 4013, and 4014. The decoder module 402 includes convolutional layers 4021, 4022, 4023, and 4024. Following each convolutional layer, a leaky rectification unit activation function is further included. The convolution kernel of each of the convolutional layers 4011, 4012, 4013, and 4014 and 4021, 4022, 4023, and 4024 is 1×1. The number of channels of the convolutional layer 4011 is equal to the first number. The number of channels of the convolutional layer 4024 is equal to the second number. The number of channels of the convolutional layer 4012 is equal to the number of channels of the convolutional layer 4023, and is configured to be, for example, 16. The number of channels of the convolutional layer 4013 is equal to the number of channels of the convolutional layer 4022, and is configured to be, for example, 32. The number of channels of the convolutional layer 4014 is equal to the number of channels of the convolutional layer 4021, and is configured to be, for example, 64. The above is merely an example, and the encoder module and the decoder module may each include two convolutional layers, three convolutional layers, or four or more convolutional layers. The numbers of channels in the other convolutional layers other than the input layer and the output layer may be configured to be other values. This embodiment of the present application is not limited thereto.

In some embodiments, the method may further include (not shown): acquiring training data, using the training data to train parameters of the training model, and in step 102, inputting the aforementioned first number of input images into the training model. The scanned object may be scanned by a magnetic resonance instrument to acquire the original image signal of the training data, and the original image signal of the training data may be preprocessed to obtain the first number of input images in the training data. Specific implementations of acquisition and preprocessing of the original image signal are as described above, and details are not repeated herein.

In some embodiments, the second number of medical functional parameter diagrams required by the training data may be calculated by using an existing analytical formula. Alternatively, the original image signal of the training data is inputted into a medical imaging workstation to acquire the second number of medical functional parameter diagrams of the training data, and the second number of medical functional parameter diagrams of the training data are used as gold standard diagrams (truth value diagrams).

In some embodiments, a first number of input training images and labeled gold standard diagrams corresponding thereto (the second number of medical functional parameter diagrams, which may be regarded as an output of the training model) are used as a group of training data, which is inputted into the aforementioned training model to train parameters of the training model. Multiple groups of training data may be acquired in the same manner, and the multiple groups of training data are used to train the parameters of the training model to improve the accuracy of the training model.

In some embodiments, the second number of medical functional parameter diagrams used in the training phase are of the same type as the second number of medical functional parameter diagrams that need to be acquired during actual application.

Figure 5:
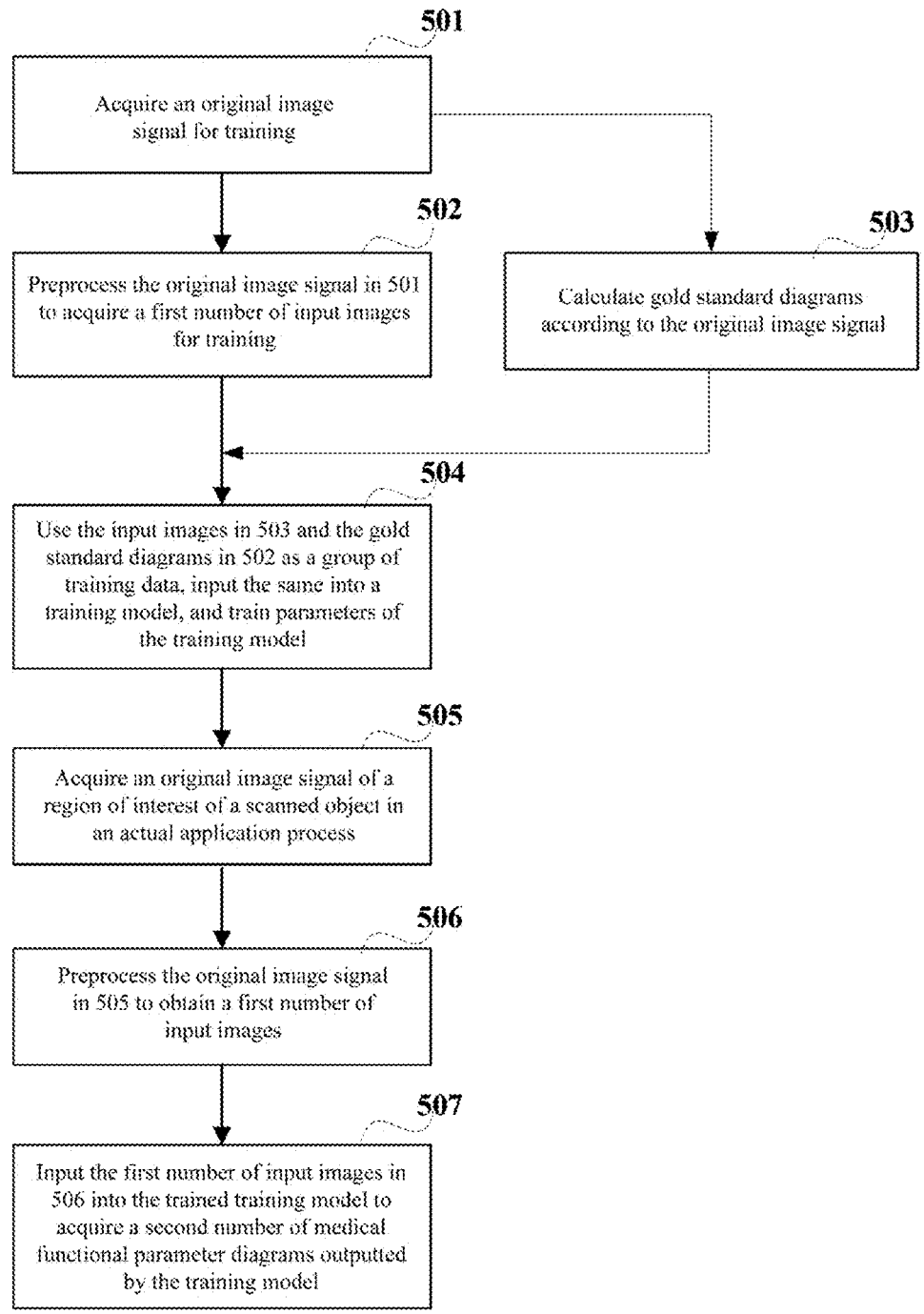
FIG. 5 is a schematic diagram of a medical image acquisition method according to an embodiment of the present application.

FIG. 5 is a schematic diagram of a medical functional parameter acquisition method according to the present application. As shown in FIG. 5, the method includes: at step 501, acquiring an original image signal for training and at step 502, calculating gold standard diagrams according to the original image signal. For example, a second number of medical functional parameter diagrams corresponding to the original image signal are calculated according to the original image signal by using an existing formula, or the original image signal may be inputted into a workstation to acquire the second number of medical functional parameter diagrams, namely the gold standard diagram, for training.

The method includes at step 503, preprocessing the original image signal in 501 to acquire a first number of input images (such as modular images) for training. At step 504, the method includes using the input images in 503 and the gold standard diagrams in 502 as a group of training data, inputting the same into a training model, and training parameters of the training model. For example, the same or different regions of interest of different scanned objects may be scanned to acquire multiple original image signals for training, 502-503 are performed on each original image signal to acquire multiple groups of training data, and the multiple groups of training data are inputted into the training model to train the parameters of the training model.

The method further includes, at step 505, acquiring an original image signal of a region of interest of a scanned object in an actual application process. At step 506, the method includes preprocessing the original image signal in 505 to obtain a first number of input images (such as modular images); and at step 507, the method includes inputting the first number of input images in 506 into the trained training model to acquire a second number of medical functional parameter diagrams outputted by the training model.

It is worth noting that FIG. 5 merely schematically illustrates an embodiment of the present application, but the present application is not limited thereto. For example, the execution order of all operations may be adjusted appropriately. In addition, some other operations may be added, or some of the operations may be skipped. Those skilled in the art could make appropriate variations according to the above disclosure, rather than being limited merely to the disclosure of FIG. 5.

It should be noted that the above medical functional parameter diagram in the embodiments of the present application is applicable to any region of interest of any scanned object, and the embodiments of the present application are not limited thereto.

The above embodiments merely provide illustrative description of the embodiments of the present application. However, the present application is not limited thereto, and appropriate variations may be made on the basis of the above embodiments. For example, each of the aforementioned embodiments may be used alone, or one or more of the aforementioned embodiments may be combined.

According to the above embodiments, a training model is used to determine an analytic relationship between respective pixels at the same position in multiple input images, and multiple medical functional parameter diagrams are determined according to the analytic relationship, thereby achieving fast calculation of SyMRI function parameter diagrams and high scalability.

Embodiments of the Second Aspect

An embodiment of the present application provides a medical image acquisition apparatus. The same content as that in the embodiments of the first aspect is not repeated.

Figure 6:
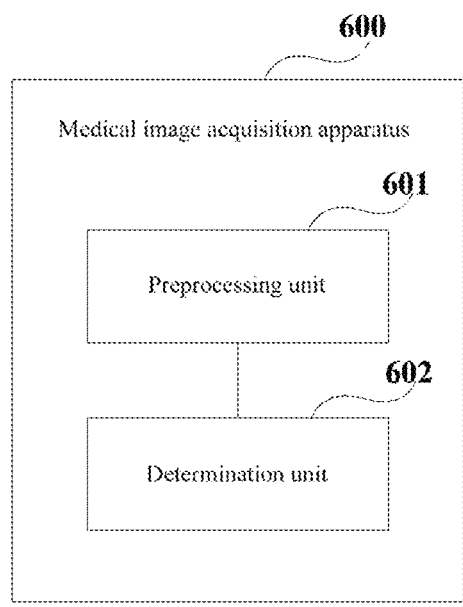
FIG. 6 is a schematic diagram of a medical image acquisition apparatus according to an embodiment of the present application.

FIG. 6 is a schematic diagram of the medical image acquisition apparatus according to the embodiment of the present application. As shown in FIG. 6, a medical image acquisition apparatus 600 includes: a preprocessing unit 601, for preprocessing an original image signal to obtain a first number of input images; and a determination unit 602, for using a training model to determine an analytic relationship between respective pixels at the same position in the first number of input images. The determination unit 602 further determines, according to the analytic relationship, a second number of medical functional parameter diagrams corresponding to the original image signal.

In some embodiments, for implementations of the preprocessing unit 601 and the determination unit 602, reference may be made to 101-102 of the embodiments of the first aspect, and the same content will not be repeated.

In some embodiments, the preprocessing unit 601 acquires echo signals corresponding to different excitation pulses, the number of the echo signals being the first number, and determines the first number of input images according to the first number of echo signals.

In some embodiments, the preprocessing unit 601 extracts the square root of the sum of the square of a real part and the square of an imaginary part corresponding to each echo signal, so as to obtain a corresponding input image. For example, the first number is equal to eight.

In some embodiments, the training model is a convolutional neural network having an encoder-decoder structure. Each of an encoder module and a decoder module of the convolutional neural network includes at least one convolutional layer, and each convolutional layer uses a 1×1 convolution kernel.

In some embodiments, the number of channels of the first convolutional layer of the encoder module is equal to the first number, and the number of channels of the last convolutional layer of the decoder module is equal to the second number.

In some embodiments, the convolutional neural network uses a leaky rectification unit activation function.

In some embodiments, the apparatus may further include: a training unit (not shown), for acquiring training data, and using the training data to train parameters of the training model. For implementations of the training unit and the structure of the training model, reference may be made to the embodiments of the first aspect, and details are not repeated herein.

For simplicity, FIG. 6 merely exemplarily shows a connection relationship or signal direction between the various components or modules. However, it should be clear to those skilled in the art that various related technologies such as bus connection can be used. The aforementioned components or modules may be implemented by means of hardware facilities such as a processor and a memory, and the embodiments of the present application do not impose any limitation thereto.

The above embodiments merely provide illustrative description of the embodiments of the present application. However, the present application is not limited thereto, and appropriate variations may be made on the basis of the above embodiments. For example, each of the aforementioned embodiments may be used alone, or one or more of the aforementioned embodiments may be combined.

According to the above embodiments, a training model is used to determine an analytic relationship between respective pixels at the same position in multiple input images, and multiple medical functional parameter diagrams are determined according to the analytic relationship, thereby achieving fast calculation of SyMRI function parameter diagrams and high scalability.

Embodiments of the Third Aspect

An embodiment of the present application provides a medical image acquisition device. The medical image acquisition device includes the medical image acquisition apparatus 600 as described in the embodiments of the second aspect, and the content thereof is incorporated herein. The medical image acquisition device may be, for example, a computer, a server, a workstation, a laptop computer, a smart phone, etc. However, this embodiment of the present application is not limited thereto.

Figure 7:
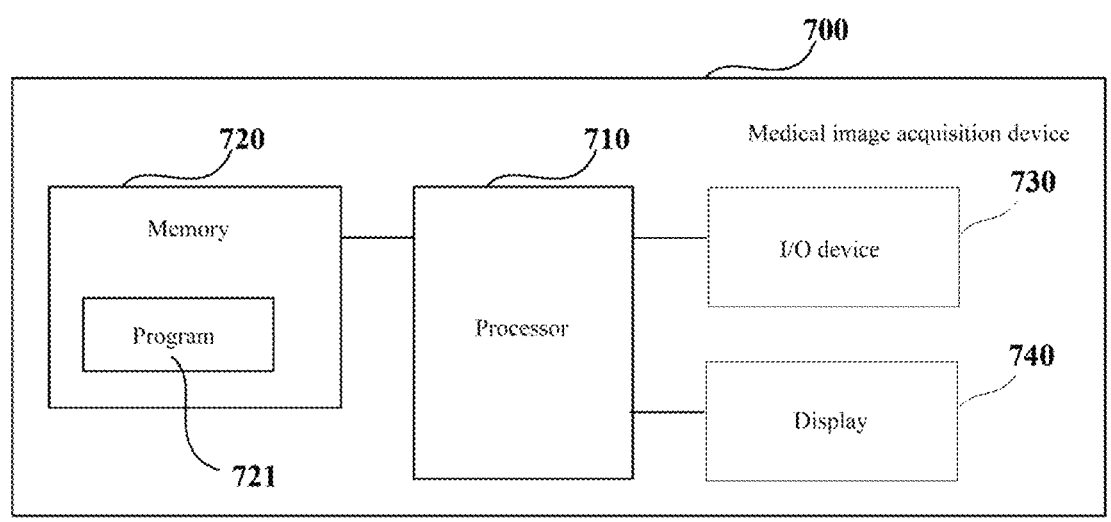
FIG. 7 is a schematic diagram of a medical image acquisition device according to an embodiment of the present application.

FIG. 7 is a schematic diagram of the medical image acquisition device according to the embodiment of the present application. As shown in FIG. 7, a medical image acquisition device 700 may include: one or more processors (such as central processing units (CPUs)) 710 and one or more memories 720. The memory 720 is coupled to the processor 710. The memory 720 may store various data, a training model, etc. In addition, the memory 720 further stores a program 721 for information processing, and the program 721 is executed under control of the processor 710.

In some embodiments, functions of the medical image acquisition apparatus 600 are integrated into the processor 710 for implementation therein. The processor 710 is configured to implement the medical image acquisition method as described in the embodiments of the first aspect.

In some embodiments, the medical image acquisition apparatus 600 is configured to be separate from the processor 710. For example, the medical image acquisition apparatus 600 may be configured to be a chip connected to the processor 710, and the functions of the medical image acquisition apparatus 600 may be implemented by means of control of the processor 710.

For example, the processor 710 is configured to perform the following control: preprocessing an original image signal to obtain a first number of input images; and using a training model to determine an analytic relationship between respective pixels at the same position in the first number of input images, and determining, according to the analytic relationship, a second number of medical functional parameter diagrams corresponding to the original image signal.

For example, the processor 710 is configured to perform the following control: acquiring training data; and using the training data to train parameters of the training model.

In some embodiments, for implementations of the processor 710 and the structure of the training model, reference may be made to the embodiments of the first aspect, and details are not repeated herein.

In addition, as shown in FIG. 7, the medical image acquisition device 700 may further include: an input/output (I/O) device 730, a display 740 (displaying the medical functional parameter diagram), etc. Functions of the aforementioned components are similar to those in the prior art, and details are not repeated herein. It is worth noting that the medical image acquisition device 700 does not necessarily include all of the components shown in FIG. 7. In addition, the medical image acquisition device 700 may further include components not shown in FIG. 7, and reference may be made to related technologies.

According to the above embodiments, a training model is used to determine an analytic relationship between respective pixels at the same position in multiple input images, and multiple medical functional parameter diagrams are determined according to the analytic relationship, thereby achieving fast calculation of SyMRI function parameter diagrams and high scalability.

Embodiments of the Fourth Aspect

An embodiment of the present application provides a magnetic resonance imaging system.

Figure 8:
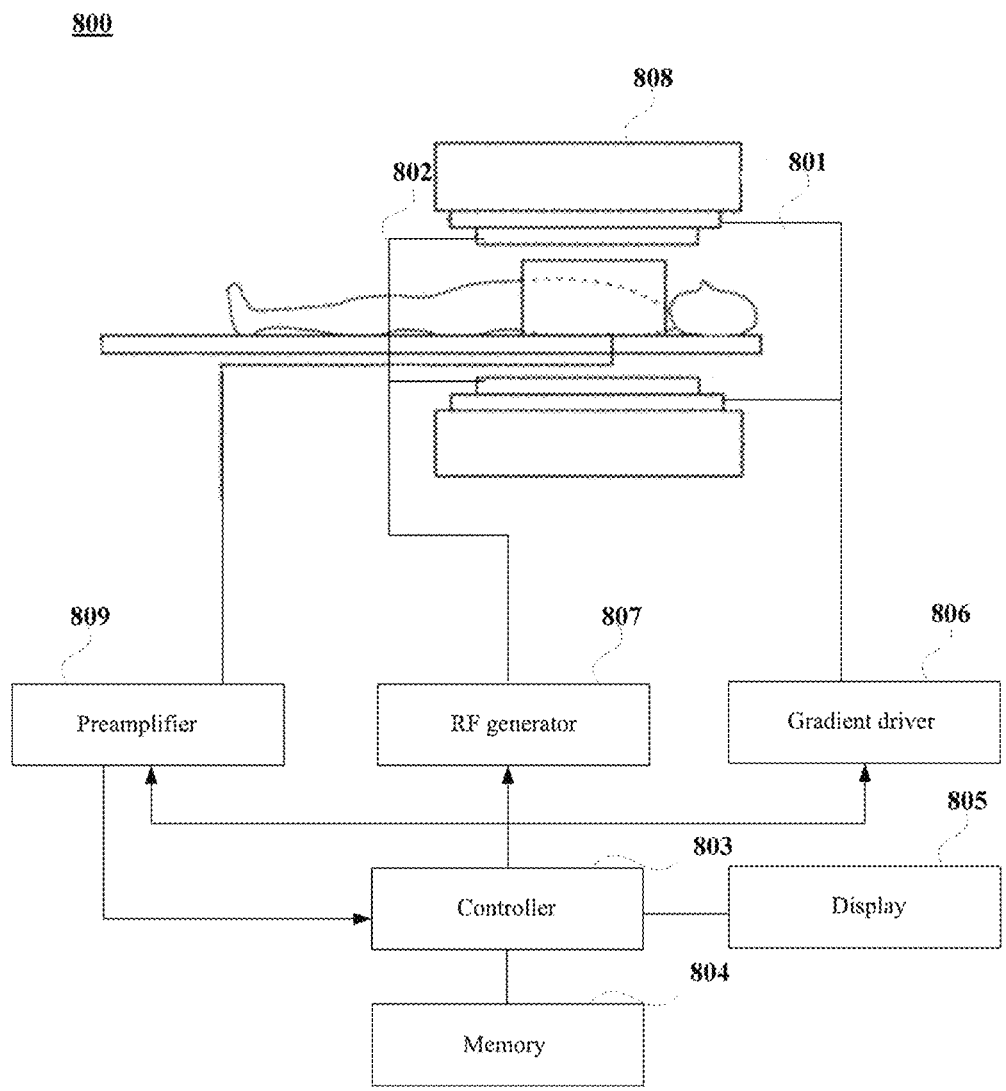
FIG. 8 is a schematic diagram of a magnetic resonance imaging system according to an embodiment of the present application.

FIG. 8 is a schematic diagram of the composition of the magnetic resonance imaging system. As shown in FIG. 8, a system 800 includes: a gradient coil assembly 801, configured to generate a gradient magnetic field and a radio-frequency coil assembly 802, configured to transmit a radio-frequency excitation pulse. The system 800 further includes a controller 803, communicating with the gradient coil assembly 801 and the radio-frequency coil assembly 802. The controller 803 is configured to instruct the gradient coil assembly 801 to generate a magnetic field gradient for use during MM scanning and instruct the radio-frequency coil assembly 802 to generate and transmit a radio-frequency excitation pulse sequence and to receive a resultant MR signal from a scanned object. The controller 803 is further configured to determine an original image signal according to the MR signal, and preprocess the original image signal to obtain a first number of input images; and use a training model to determine an analytic relationship between respective pixels at the same position in the first number of input images. The controller 803 is further configured to determine, according to the analytic relationship, a second number of medical functional parameter diagrams corresponding to the original image signal.

In some embodiments, the controller 803 is in electrical connection and/or data connection with other components of the magnetic resonance imaging system.

In some embodiments, optionally, the magnetic resonance imaging system further includes a gradient driver 806. The controller 803 provides a gradient waveform to the gradient driver. The gradient driver includes GX, GY, and GZ amplifiers, etc. Each of the GX, GY, and GZ gradient amplifiers excites a corresponding gradient coil in the gradient coil assembly 801 to generate a magnetic field gradient used to spatially encode an MR signal during MRI scanning. The gradient coil assembly 801 is included in a resonance assembly (not shown). The resonance assembly further includes a superconducting magnet having a superconducting coil 808. During operation, the superconducting coil provides a uniform longitudinal magnetic field passing through an open cylindrical imaging volume, and the cylindrical imaging volume is surrounded by the resonance assembly. For the specific coil structure of this part, reference may be made to the prior art, and details are not repeated herein.

The resonance assembly further includes a radio-frequency coil assembly 802, which may be configured to operate in a transmit and receive mode, a transmit mode, or a receive mode. An object undergoing MM scanning may be positioned within the open cylindrical imaging volume of the resonance assembly. The magnetic resonance imaging system further includes: an RF generator 807, a memory 804, and a display 805. The RF generator 807 generates an RF excitation pulse amplified by an RF amplifier (optional, not shown), and provides the pulse to the radio-frequency coil assembly 802 via a transmit/receive switch. The radio-frequency coil assembly 802 may be used to transmit the RF excitation pulse and/or to receive a resultant MR signal from a patient undergoing MRI scanning. The resultant MR signal sent by excited nuclei of the object undergoing MM scanning can be sensed and received by the radio-frequency coil assembly 802, and can be sent back to a preamplifier 809 (optional) via the transmit/receive switch. The MR signal is demodulated, filtered, and digitized in the controller 803. The transmit/receive switch electrically connects the RF amplifier to the radio-frequency coil assembly 802 during the transmit mode, and connects the preamplifier to the radio-frequency coil assembly 802 during the receive mode. The transmit/receive switch may further enable the radio-frequency coil assembly 802 to be used in the transmit mode or the receive mode. The resultant MR signal sensed and received by the radio-frequency coil assembly 802 is digitized by the controller 803, and is transferred to and stored in the memory 804.

In some embodiments, the controller 803 may communicate with a medical image acquisition device (not limited to the device in the embodiments of the third aspect), and receive a an instruction therefrom so as to instruct the RF generator 803 to generate an MRI scanning sequence to be executed during MRI scanning.

In some embodiments, the controller 803 acquires an array of original k-space data corresponding to the received MR signal until MR scanning is completed when the data is subsequently transformed into an image. The original k-space data is rearranged into separate arrays of k-space data, and each of these separate arrays of k-space data is processed by the controller 803 and is transformed into an array of image data. For example, the controller 803 converts the received MR signal into an image by using a known transformation method such as Fourier transform. For details, reference may be made to the prior art, and this embodiment of the present application is not limited thereto. After an original image signal is acquired, the original image signal is preprocessed to obtain a first number of input images. A training model is used to determine an analytic relationship between respective pixels at the same position in the first number of input images, and a second number of medical functional parameter diagrams corresponding to the original image signal are determined according to the analytic relationship. For specific implementations, reference may be made to the embodiments of the first aspect, and details are not repeated herein. Optionally, the controller 803 may further instruct the display 805 to display the second number of medical functional parameter diagrams.

In some embodiments, after acquiring the MR signal, the controller 803 may also not process the MR signal. Instead, the MR signal is sent to the medical image acquisition device 700 (such as a workstation or a computer system) as described in the embodiments of the third aspect, such that the medical image acquisition device 700 determines an original image signal, preprocess the original image signal to obtain a first number of input images, uses a training model to determine an analytic relationship between respective pixels at the same position in the first number of input images, and determines, according to the analytic relationship, a second number of medical functional parameter diagrams corresponding to the original image signal. The controller 803 receives the second number of medical functional parameter diagrams, and instructs the display 805 to display the second number of medical functional parameter diagrams.

In addition, the magnetic resonance imaging system 800 may further include components not shown in FIG. 8, such as a phase detector, a physiological acquisition controller, a scanned object positioning device, etc. For details, reference may be made to related technologies, and examples are not enumerated herein.

Figure 9:
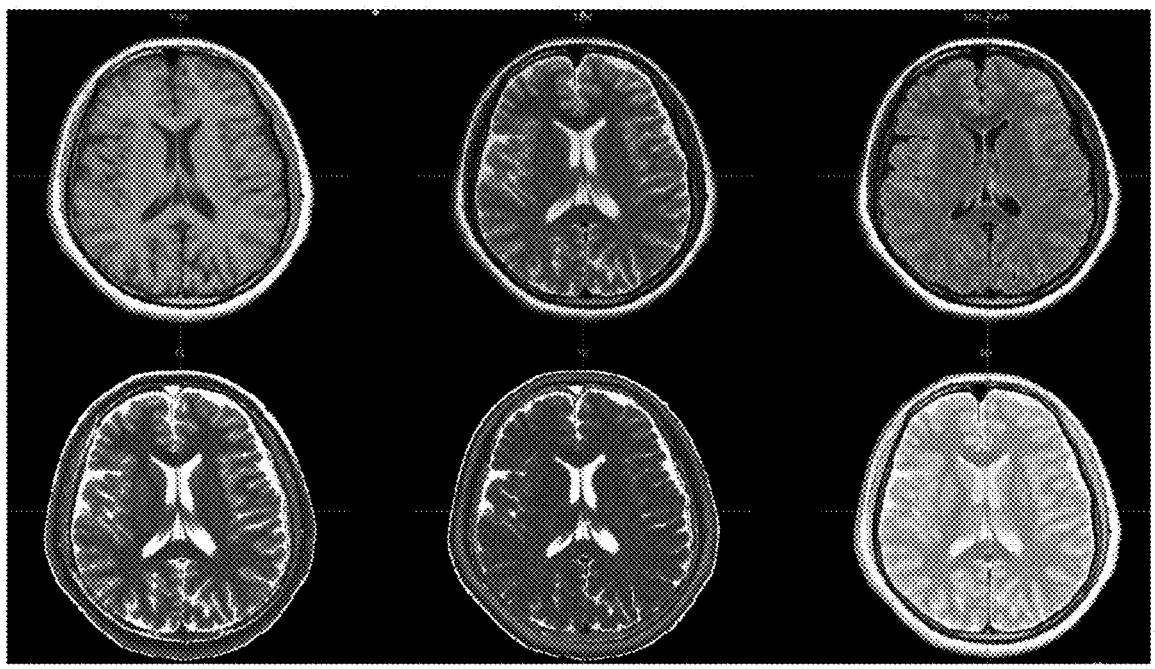
FIG. 9 is an example diagram of a medical functional parameter diagram acquired from the prior art.
Figure 10:
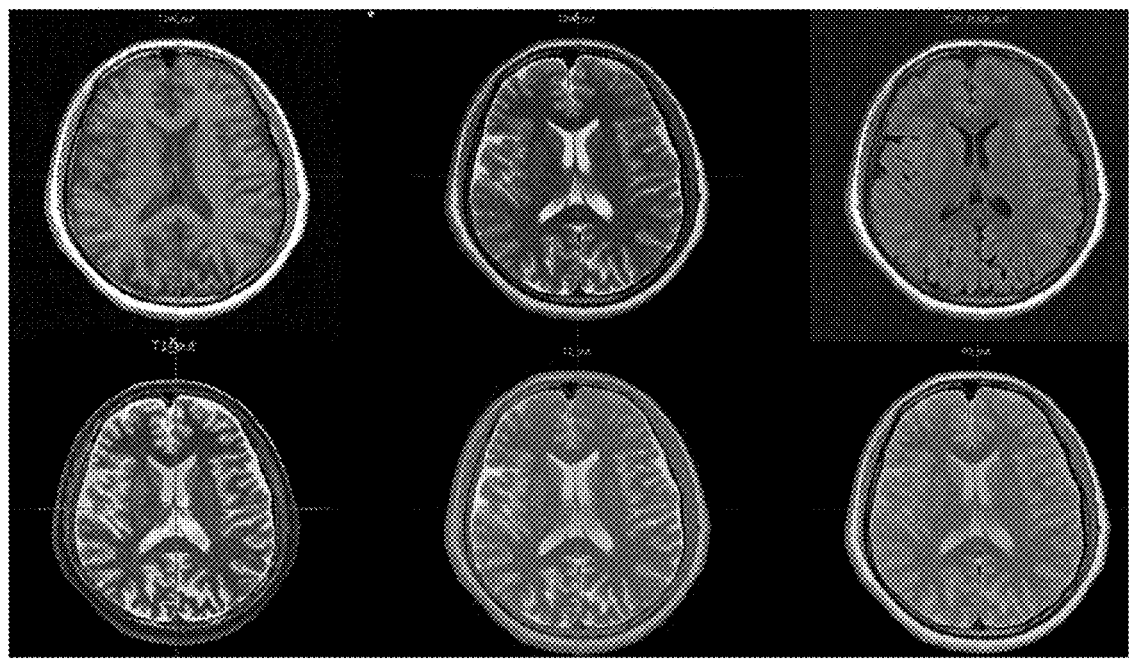
FIG. 10 is an example diagram of a medical functional parameter diagram acquired according to an embodiment of the present application.

FIG. 9 is a diagram of an example of a medical functional parameter diagram acquired from the prior art. FIG. 10 is a diagram of an example of a medical functional parameter diagram acquired by using the medical image acquisition method according to the present application. As shown in FIGS. 9 and 10, the medical image acquisition method according to the present application can accurately reconstruct each medical functional parameter diagram, and can achieve fast calculation of SyMRI function parameter diagrams and high scalability.

An embodiment of the present application further provides a computer-readable program. When the program is executed in the medical image acquisition device, the program enables a computer to implement, in the medical image acquisition device, the medical image acquisition method according to the embodiments of the first aspect.

An embodiment of the present application further provides a storage medium having a computer-readable program stored therein. The computer-readable program enables a computer to implement, in the medical image acquisition device, the medical image acquisition method according to the embodiments of the first aspect.

The foregoing apparatus and method according to the present application may be implemented by hardware, or may also be implemented by a combination of hardware and software. The present application relates to such a computer-readable program that the program, when executed by a logical component, enables the logical component to implement the foregoing apparatus or constituent components, or enables the logical component to implement the various methods or steps described above. The present application further relates to a storage medium for storing the foregoing program, such as a hard disk, a magnetic disk, an optical disc, a DVD, a flash memory, etc.

The methods/apparatuses described in conjunction with the embodiments of the present application may be embodied directly in hardware, in a software module executed by a processor, or in a combination of the two. For example, one or more functional block diagrams and/or one or more combinations of the functional block diagrams shown in the figures may correspond to software modules of a computer program procedure, or may correspond to hardware modules. The software modules may respectively correspond to the steps shown in the figures. The hardware modules, for example, may be implemented by firming the software modules by using a field programmable gate array (FPGA).

The software modules may be located in a RAM, a flash memory, a ROM, an EPROM, an EEPROM, a register, a hard disk, a floppy disk, a CD-ROM, or any storage medium in other forms known in the art. A storage medium may be coupled to a processor, so that the processor can read information from the storage medium and write information into the storage medium. Alternatively, the storage medium may be a component of the processor. The processor and the storage medium may be located in an ASIC. The software module may be stored in a memory of a mobile terminal, and may also be stored in a memory card of a pluggable mobile terminal. For example, if a device (such as a mobile terminal) uses a MEGA-SIM card having a large capacity or a flash memory apparatus having a large capacity, then the software module may be stored in the MEGA-SIM card or the flash memory apparatus having a large capacity.

One or more functional blocks and/or one or more combinations of the functional blocks described with respect to the figures may be implemented as a universal processor, a digital signal processor (DSP), an application-specific integrated circuit (ASIC), a field programmable gate array (FPGA), or other programmable logic devices, discrete gate or transistor logic devices, discrete hardware assemblies, or any appropriate combinations thereof. The one or more functional blocks and/or the one or more combinations of the functional blocks described with respect to the figures may also be implemented as a combination of computing devices, such as a combination of a DSP and a microprocessor, multiple microprocessors, one or more microprocessors in communication combination with a DSP, or any other such configuration.

The present application is described above with reference to specific implementations. However, it should be clear to those skilled in the art that such descriptions are merely illustrative and are not intended to limit the scope of protection of the present application. Various variations and modifications may be made by those skilled in the art according to the principle of the present application, and these variations and modifications also fall within the scope of the present application.

Regarding the implementations including the above embodiments, the following attachments are further disclosed.

A medical image acquisition method, comprising: preprocessing an original image signal to obtain a first number of input images; and using a training model to determine an analytic relationship between respective pixels at the same position in the first number of input images, and determining, according to the analytic relationship, a second number of medical functional parameter diagrams corresponding to the original image signal.

The step of preprocessing an original image signal to obtain a first number of input images in the above method further comprises acquiring echo signals corresponding to different excitation pulses, the number of the echo signals being the first number, and determining the first number of input images according to the first number of echo signals.

The method further comprises extracting the square root of the sum of the square of a real part and the square of an imaginary part corresponding to each echo signal so as to obtain a corresponding input image. In one embodiment, the first number is equal to eight. Further, in one embodiment, the training model is a convolutional neural network having an encoder-decoder structure, each of an encoder module and a decoder module of the convolutional neural network comprises at least one convolutional layer, and each convolutional layer uses a 1×1 convolution kernel.

In the above medical image acquisition method, the number of channels of a first convolutional layer of the encoder module is equal to the first number. Moreover, the convolutional neural network uses a leaky rectification unit activation function. Further, in one embodiment, the medical functional parameter diagrams comprise a quantitative parameter diagram and a weighted parameter diagram. The medical image acquisition method further comprises acquiring training data, and using the training data to train parameters of the training model.

A magnetic resonance imaging system is presented, wherein the system comprises a gradient coil assembly, configured to generate a gradient magnetic field; and a radio-frequency coil assembly, configured to transmit a radio-frequency excitation pulse. The magnetic resonance imaging system further comprises a controller, communicating with the gradient coil assembly and the radio-frequency coil assembly. The controller is configured to instruct the gradient coil assembly to generate a magnetic field gradient for use during MRI scanning and to instruct the radio-frequency coil assembly to generate and transmit a radio-frequency excitation pulse sequence and to receive a resultant MR signal from a scanned object. The controller is also configured to determine an original image signal according to the MR signal, and preprocess the original image signal to obtain a first number of input images; and use a training model to determine an analytic relationship between respective pixels at the same position in the first number of input images, and determine, according to the analytic relationship, a second number of medical functional parameter diagrams corresponding to the original image signal.

A medical image acquisition device is also presented. The medical image acquisition device comprises a memory and a processor, wherein the memory stores a computer program, and the processor is configured to execute the computer program so as to implement the medical image acquisition method.

In another embodiment, a storage medium having a computer-readable program stored therein is presented. The computer-readable program enables a computer to implement, in a medical image acquisition device, the medical image acquisition method presented above.

The invention claimed is:

1. A medical image acquisition apparatus comprising:
a processor; and
a memory device comprising instructions executable by the processor to:
preprocess an original image signal of a region of a scanned object, the original image signal being acquired in a single imaging sequence, to obtain a first number of input images of the region of the scanned object, the single imaging sequence comprising emitting an excitation pulse signal via a transmitting coil; and
use a training model to determine an analytic relationship between respective pixels at the same position in the first number of input images; and
determine, according to the analytic relationship, a second number of medical functional parameter diagrams corresponding to the original image signal.

2. The apparatus according to claim 1, wherein the instructions are executable by the processor to acquire echo signals corresponding to different excitation pulses, the number of the echo signals being the first number, and determine the first number of input images according to the first number of echo signals.

3. The apparatus according to claim 2, wherein the instructions are executable by the processor to extract the square root of the sum of the square of a real part and the square of an imaginary part corresponding to each echo signal, so as to obtain a corresponding input image.

4. The apparatus according to claim 1, wherein the first number is equal to eight.

5. The apparatus according to claim 1, wherein the training model is a convolutional neural network having an encoder-decoder structure, each of an encoder module and a decoder module of the convolutional neural network comprises at least one convolutional layer, and each convolutional layer uses a 1×1 convolution kernel.

6. The apparatus according to claim 5, wherein the number of channels of a first convolutional layer of the encoder module is equal to the first number.

7. The apparatus according to claim 5, wherein the convolutional neural network uses a leaky rectification unit activation function.

8. The apparatus according to claim 1, wherein the medical functional parameter diagrams comprise a quantitative parameter diagram and a weighted parameter diagram.

9. A medical image acquisition method comprising:
preprocessing an original image signal of a region of a scanned object, the original image signal being acquired in a single imaging sequence, to obtain a first number of input images; of the region of the scanned object, the single imaging sequence comprising emitting an excitation pulse signal via a transmitting coil and
using a training model to determine an analytic relationship between respective pixels at the same position in the first number of input images, and determining, according to the analytic relationship, a second number of medical functional parameter diagrams corresponding to the original image signal.

10. The method of claim 9, comprising acquiring echo signals corresponding to different excitation pulses, the number of the echo signals being the first number, and determine the first number of input images according to the first number of echo signals.

11. The method of claim 10, comprising extracting the square root of the sum of the square of a real part and the square of an imaginary part corresponding to each echo signal, so as to obtain a corresponding input image.

12. The method of claim 9, wherein the first number is equal to eight.

13. The method of claim 9, wherein the training model is a convolutional neural network having an encoder-decoder structure, each of an encoder module and a decoder module of the convolutional neural network comprises at least one convolutional layer, and each convolutional layer uses a 1×1 convolution kernel.

14. The method of claim 13, wherein the number of channels of a first convolutional layer of the encoder module is equal to the first number.

15. The method of claim 13, wherein the convolutional neural network uses a leaky rectification unit activation function.

16. The method of claim 9, wherein the medical functional parameter diagrams comprise a quantitative parameter diagram and a weighted parameter diagram.

17. A non-transitory computer-readable storage medium comprising instructions that, when executed by a processor, cause the processor to:
preprocess an original image signal of a region of a scanned object, the original image signal being that is acquired in a single imaging sequence, to obtain a first number of input images of the region of the scanned object, the single imaging sequence comprising emitting an excitation pulse signal via a transmitting coil; and
use a training model to determine an analytic relationship between respective pixels at the same position in the first number of input images; and
determine, according to the analytic relationship, a second number of medical functional parameter diagrams corresponding to the original image signal.

18. The non-transitory computer-readable storage medium of claim 17, wherein the instructions, when executed by the processor, cause the processor to acquire echo signals corresponding to different excitation pulses, the number of the echo signals being the first number, and determine the first number of input images according to the first number of echo signals.

19. The non-transitory computer-readable storage medium of claim 18, wherein the instructions, when executed by the processor, cause the processor to extract the square root of the sum of the square of a real part and the square of an imaginary part corresponding to each echo signal, so as to obtain a corresponding input image.

20. The non-transitory computer-readable storage medium of claim 17, wherein the training model is a convolutional neural network having an encoder-decoder structure, each of an encoder module and a decoder module of the convolutional neural network comprises at least one convolutional layer, and each convolutional layer uses a 1×1 convolution kernel.

* * * * *